United States Patent
Sato et al.

(10) Patent No.: US 6,962,352 B2
(45) Date of Patent: Nov. 8, 2005

(54) GASKET

(75) Inventors: Hiroyuki Sato, Aichi-ken (JP);
Takahiro Asai, Aichi-ken (JP);
Toshikazu Kondo, Aichi-ken (JP);
Hirokazu Fujimo, Bisai (JP)

(73) Assignees: Toyoda Gosei Co., Ltd., Aichi-ken (JP); Tokyo Silicone Co., Ltd., Saitama-ken (JP)

( * ) Notice: Subject to any disclaimer, the term of this patent is extended or adjusted under 35 U.S.C. 154(b) by 51 days.

(21) Appl. No.: 10/626,774

(22) Filed: Jul. 25, 2003

(65) Prior Publication Data

US 2004/0155413 A1 Aug. 12, 2004

(30) Foreign Application Priority Data

Jul. 30, 2002 (JP) .......................................... 2002-221954

(51) Int. Cl.[7] ................................................. F16J 15/08
(52) U.S. Cl. ...................... 277/650; 277/652; 277/627; 277/592
(58) Field of Search ................................. 277/650, 652, 277/692, 627

(56) References Cited

U.S. PATENT DOCUMENTS 5,807,948 A * 9/1998 Sagane et al. ............... 526/336
6,319,973 B1 * 11/2001 Lemm et al. ................ 524/404
6,521,699 B2 * 2/2003 Feder et al. ................. 524/588

FOREIGN PATENT DOCUMENTS

| JP | A-11-255929 | 9/1999 |
| JP | A-2000-026787 | 1/2000 |
| JP | A-2000-337515 | 12/2000 |

OTHER PUBLICATIONS

Shu Kanbara, "Revised and Enlarged New Edition Synthetic Rubber Handbook", Nov. 30, 1967, p 662 (Discussed in p. 1 of the spec.).

* cited by examiner

*Primary Examiner*—Enoch Peavey
(74) *Attorney, Agent, or Firm*—Posz & Bethards, PLC

(57) ABSTRACT

A gasket provided with a sliding-treated layer on the surface of a fluorine rubber gasket body. The sliding-treated layer is a baked coated film of a sliding treating agent. The sliding treating agent is an aqueous emulsion containing a solid lubricant, an urethane-based resin as a matrix, and a reactive group-coupled alkyltrialkoxysilane series compound represented by the following chemical formula as an adherability modifier.

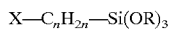

$$X-C_nH_{2n}-Si(OR)_3$$

{wherein X (reactive group) is an amino-containing group or an epoxy-containing group, n is a natural number of 2 to 4, and R is an alkyl group having a carbon number of 1 to 3}.

4 Claims, 3 Drawing Sheets

(A)

(B)

Results of wrenching sealability test (after durability test)

|  |  | Determination |
|---|---|---|
| Embodiment Example | ◇ | ○ |
| Conventional Example | ■ | × |
| Comparative Example | △ | ○ |

US 6,962,352 B2

GASKET

CROSS-REFERENCE TO RELATED APPLICATION

This application claims priority from Japanese patent application No.2002-221954 filed Jul. 30, 2002, the complete disclosure of which is hereby incorporated into the present application by this reference.

BACKGROUND OF THE INVENTION

The present invention relates to a sliding-treated gasket. In particular, it is an invention suitable for a fuel cap gasket.

Herein, the present invention is explained by exemplifying a fuel cap gasket, being not limiting.

Abbreviations of main polymers and reagents used in the present invention are as follows:

NBR . . . nitrile rubber
PVC . . . polyvinyl chloride
FKM . . . fluorine rubber.

Conventionaly, a material for a fuel cap gasket was mainly a polyblend of NBR/PVC because when PVC is blended with NBR, the resistance to weather, the resistance to ozone, the resistance to oil, the resistance to chemicals and the resistance to abrasion are improved ("Revised and enlarged New Edition Synthetic Rubber Handbook" (Nov. 30, 1967) Asakurashoten, P.662).

And, as shown in FIG. 1, it is necessary to open and close a fuel cap 12 every oil feeding. Upon this, a gasket 14 mounted on a cap 12 is slided with a seal bearing surface 10$a$ of a filler neck 10. For this reason, it is required to have the better sliding property.

Therefore, previously, chlorinating treatment was performed in order to enhance the sliding property of a gasket 14.

Specifically, a rubber was reacted with chlorine freed by dissolving a chlorine compound (e.g. trichloroisocyanuric acid) in water.

On the other hand, from a viewpoint of the environmental problem, it has been required that an amount of gasoline permeating from an oil feeding port, that is, a fuel cap is smaller than previous (e.g. Fuel Permeation Regulation in North America Act).

However, since a polyblend of NBR/PVC can not cope with the requirement, it can be contemplated that a fuel cap is formed of a fluorine-based rubber (FKM) having the excellent resistance to gasoline permeability.

However, since even FKM is not sufficient in the sliding property like the case of NBR/PVC, it is necessary to perform sliding treatment. However, the chlorinating treatment (the sliding treatment) as in NBR/PVC is impossible to apply to FKM.

Then, the present inventors coated (scattered) a solid lubricant such as molybdenum disulfide (MOS$_2$) and the like, but it was found that the lubricant is peeled after a durability test (e.g. fasten/unfasten 3000 times), and the sliding property cannot be maintained for a long period of time.

Although the inventiveness of the present invention is not influenced, there are following publications as the related prior art exhibiting the technical status.

JP-A 11-255929: A surface treating agent containing a phosphorus compounding agent was coated on the surface of a fluorine rubber after primary vulcanization, and this was dried and heated to form a surface-treated layer and, at the same time, after secondary vulcanization, a fluorine resin was coated thereon to maintain the adherability of a coating layer.

JP-A 2000-337515: By covering an elastic layer (e.g. FKM rubber) of a gasket with a harder covering layer (e.g. fluorine resin) than the elastic layer, creep and flowing at pressing are prevented.

SUMMARY OF THE INVENTION

In view of the above circumstances, an object of the present invention is to provide a gasket in which a sliding-treated layer is not peeled and the sliding property is hardly reduced even after a durability test on a fuel cap.

A gasket of the present invention solves the above problem (object) by the following essential features.

A gasket provided with a sliding-treated layer on the surface of a fluorine rubber gasket body characterized in that the sliding-treated layer is a baked coated film of a sliding treating agent which is an aqueous emulsion containing a solid lubricant, an urethane-based resin as a matrix, and a reactive group-coupled alkyltrialkoxysilane series compound (hereinafter, "ATAS") represented by the following chemical formula as an adherability modifier

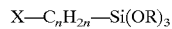

{wherein X (reactive group) is an amino-containing group or an epoxy-containing group, n is a natural number of 2 to 4, and R is an alkyl group having a carbon number of 1 to 3}.

In addition, from a viewpoint of a composition, a sliding treating agent used in a gasket of the present invention is an aqueous emulsion containing 20 to 70% of a solid lubricant (in the form of an emulsion), 20 to 70% of an urethane-based resin (in the form of an emulsion), and 2 to 8% of the ATAS.

By combining urethane and ATAS, the adherability between a sliding-treated layer and FKM is increased. The reason is presumed as follows:

due to improvement in the strength of an urethane resin associated with a thermosetting reaction at firing and a hydrogen bond between the ATAS (silane coupling agent) and a FKM-blended chemical.

In a gasket sliding-treated agent having the above respective essential features, it is desirable that a solid lubricant is a fluorine resin powder because it has a lower friction coefficient as compared with other solid lubricants. Incidentally, graphite has a friction coefficient of 0.8, and molybdenum disulfide has a friction coefficient of 0.68, while PTFE (fluorine resin) has a friction coefficient of 0.04.

DESCRIPTION OF THE PREFERRED EMBODIMENTS

Figure 1:
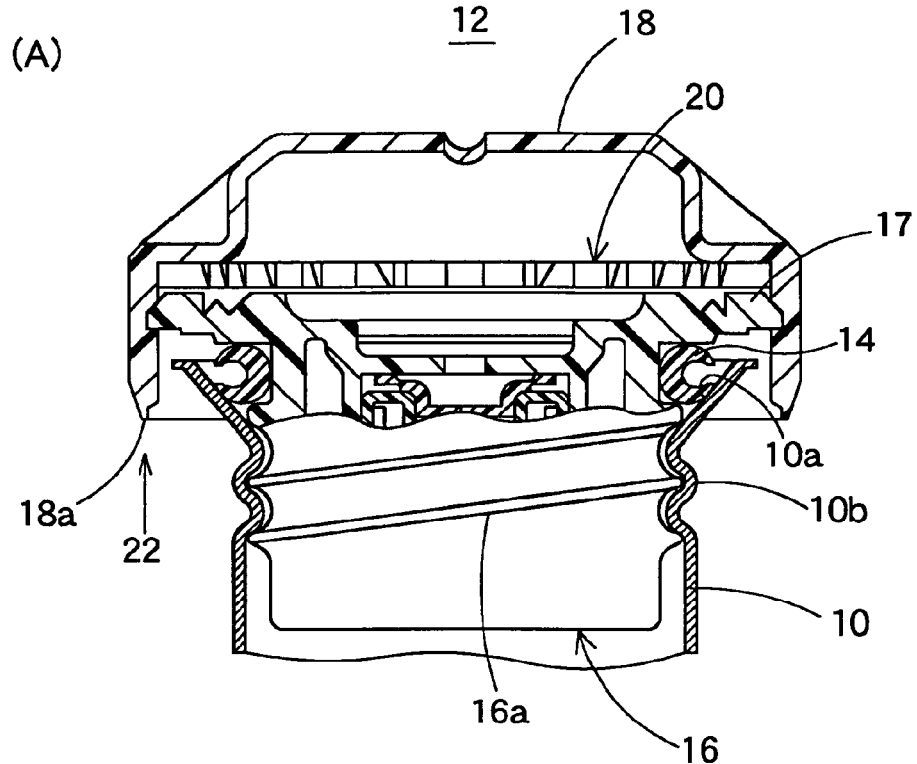
FIG. 1 is a schematic cross-sectional view of an aspect of attachment of a gasket, showing a position of application of a gasket of the present invention, and a view showing a positional relationship between a cap and a wrenching equipment in a wrenching test.
Figure 1:
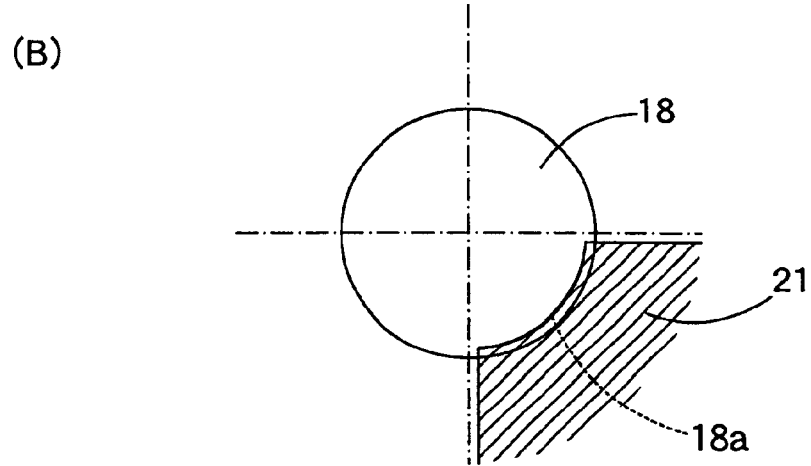

Application of the present invention to a fuel cap gasket will be explained in detail below.

A sliding treating agent which forms a sliding-treated layer on a gasket body is basically an aqueous emulsion containing a solid lubricant, an urethane-based resin as a matrix, and a reactive group-coupled alkyltrialkoxysilane series compound (ATAS) as an adherability modifier.

Here, as the solid lubricant, a fluorine resin powder is desirable, and other examples include plastic series solid lubricants such as (super) rigid PE, polyamide (nylon) powder and the like, and inorganic solid lubricants such as molybdenum disulfide ($MOS_2$), boron nitride, graphite fluoride and tungsten disulfide (see "Chemical Handbook Application Chapter, Revised $3^{rd}$ Edition" (Mar. 15, 1980), Maruzen, p.965).

And, the solid lubricant is usually incorporated in the form of an emulsion, and the concentration in the emulsion form is usually 20 to 70%, desirably 30 to 60%.

Specifically, in the case of the fluorine resin (polytetrafluoroethylene: PTFE) powder, as "PTFE dispersion", those sold under trade names such as "D1-E, D2-E, D3-E" (Daikin Industries, Ltd.), "30-J" (DuPont), "AD-1, AD-639, AD-936" (Asahi Glass Company) and the like can be employed.

An urethane-based resin is used because the resin is tough and excellent in the resistance to chemicals including the resistance to oil, and is hardly deteriorated with time (excellent in the durability). The urethane-based resin may be a polyester series or a polyether series. Conveniently, the urethane resin may be used with an acrylic resin having the better compatibility with the urethane resin and the better resistance to weather, jointly.

And, like the solid lubricant, the urethane-based resin is incorporated in the form of an emulsion, and the concentration in the form of an emulsion is usually 20 to 70%, desirably 30 to 60%.

Specifically, as the "urethane resin emulsion", those sold under trade names such as "Ucoat UWS-145" (Sanyo Chemical Industries Ltd.), and as an "urethane-acrylic composite emulsion", those sold under trade names such as "VONCOATCG-5010, 5030, 5050, 5060" (Dainippon Inc and chemicals, Incorporated) and the like can be suitably employed.

As the ATAS, as a silane coupling agent represented by the following chemical formula can be employed:

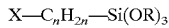

{wherein X (reactive group) is an amino-containing group or an epoxy-containing group, n is a natural number of 2 to 4, and R is an alkyl group having a carbon number of 1 to 3}.

Specifically, as a silane coupling agent in which the reactive group is an amino-containing group, 3-aminopropyltrimethoxysilane, 3-aminopropyltriethoxysilane, 3-(2-aminoethyl) aminopropyltrimethoxysilane, 3-(2-aminoethyl) aminopropyltriethoxysilane and the like, and as a silane coupling agent in which the reactive group is an epoxy-containing group, 3-glycidoxypropyltrimethoxysilane, 3-glycidoxypropyltriethoxysilane and the like can be suitably employed.

An amount of the silane coupling agent to be incorporated is usually 2 to 8%, desirably 4 to 6%. When the amount of the silane coupling agent to be incorporated is too small, the adherability increasing effect can not be expected and, when the amount is too large, further increase in the adherability increasing effect can not be expected, as well as it may have adverse effect on the sliding activity of a sliding treating agent.

And, it is desirable to appropriately add a disperse dye and a polyhydric alcohol, in addition to the above mentioned respective components, to the sliding treating agent of the present invention.

Here, the disperse dye is added in order to make easy recognition with naked eyes of the presence or the absence of a coating of a sliding coated film. Here, an amount of the disperse dye is 0 to 5%, desirably 1 to 3% in a liquid composition.

In addition, the polyhydric alcohol is added in order to stabilize a liquid. Specifically propylene glycol, diethylene glycol, glycerin and the like can be suitably employed.

And, the alcohol is employed by appropriately diluting with water (pure water) depending on a required thickness of a coating and performance of a coating machine. An amount of water to be added is 30 to 60 parts by weight relative to 100 parts by weight of the above-described emulsion composition solution.

At incorporation of the above-described solid lubricant and urethane resin, a material may not be necessarily in the form of an emulsion, and may be in the form of an emulsion at a final step of preparing a sliding treating agent.

Then, an aspect of using above-described sliding treating agent (surface treating agent) will be explained.

A body of a gasket to which the sliding treating agent is applied is a fluorine rubber series.

Examples of a fluorine rubber include vinylidene fluoride-propylene hexafluoride copolymer (VDF-HFP series), vinylidene fluoride-propylene hexafluoride-tetrafluoroethylene terpolymer (VDF-HFP-TFE series), vinylidene fluoride-perfluorovinyl ether-tetrafluoroethylene copolymer (modified VDF-TFE series), tetrafluoroethylene-perfluorovinyl ether copolymer (fluorine-containing vinyl ether series) and the like. Among them, the modified VDF-TFE series excellent in the resistance to low temperature is desirable.

A vulcanization series of these fluorine rubbers may be apolyamine vulcanization series, a polyol vulcanization series, or a peroxide vulcanization series.

And, a surface-treating agent (sliding treating agent) for a gasket which is the above-described aqueous emulsion is coated on a gasket body formed by vulcanizing a rubber blend containing the above-described FKM as a raw material rubber. Coating is usually performed by spray coating, or may be performed by impregnation coating or by brush coating.

And, a coating amount is 3 to 40 $\mu m$, desirably 5 to 22 $\mu m$ at a dry film thickness. When the film thickness is too small, a sliding coated film is abraded, and is defective in reliance in the durability and, when the thickness is too large, crazing, crack, peeling and the like easily occur, being also defective in reliance in the durability.

After coating, a coated material is baked at usually 100 to 250° C.×60 to 5 minutes, desirably 60 to 200° C.×40 to 10 minutes.

When a baking temperature is too low, it is difficult to obtain the sufficient tensile strength. Conversely, when a baking temperature is too high, elongation at break becomes small (and a coated film becomes hard and fragile), and crazing, crack, peeling and the like easily occur as in the case of a thick coated film.

Thus, a sliding-treated gasket 14 is mounted on a fuel cap 12 as shown in FIG. 1, and the fuel cap 12 is attached to a filler neck 10.

The fuel cap 12 consists of a resin closure 16 fitting in the filler neck 10, and a shell 18 covering an upper part of the closure 16. The closure 16 is provided with a male threading part 16a that is threadable into a female threading part 10a of the filler neck 10. And, an upper end of the closure 16 is provided with a flange part 17 engaging to the shell 18, and a gasket 14 is mounted on a lower surface of the flange part 17.

Between the shell 18 and the closure 16 is provided a ratchet mechanism 20 in order that a rotating torque at a magnitude larger than a prescribed one dose not act on the closure 16.

In the fuel cap with a gasket 14 attached thereto, as shown in Experimental Example described below, also after a durability test, a sliding coated film layer is not peeled, and the sufficient sliding property can be maintained and, in a set rotating torque, maintenance of the sufficient sealability (compressibility) can be expected.

EXPERIMENTAL EXAMPLE

Figure 2:
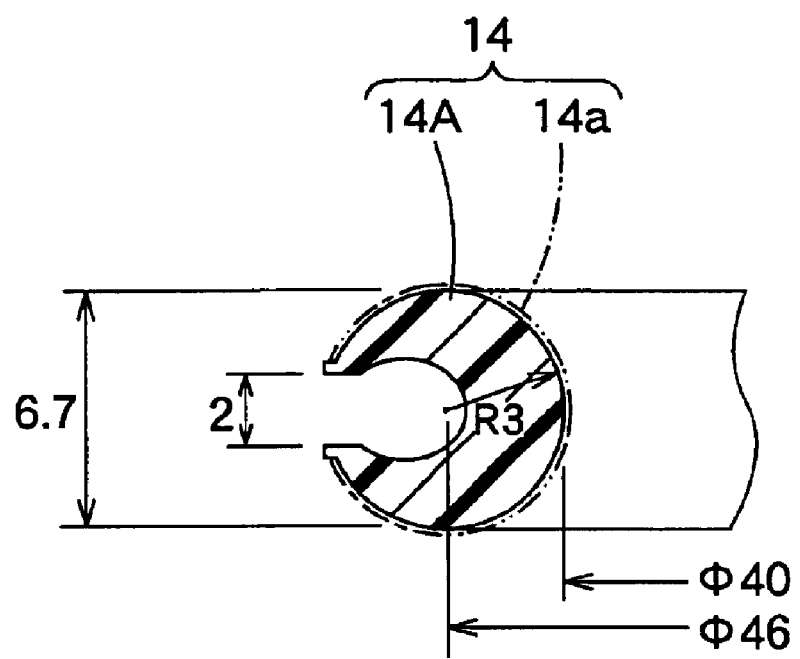
FIG. 2 is an enlarged cross-sectional view showing one embodiment of a gasket.

Gaskets having size specifications shown in FIG. 2 were molded under the following conditions, respectively, using rubber blends having the following formations.

| NBR/PVC series rubber blending formulation | |
|---|---|
| NBR/PVC = 70/30 | 100 parts |
| SRF black | 105 parts |
| Process oil | 40 parts |
| Stearic acid | 1 part |
| Zinc oxide | 5 parts |
| Wax | 2 parts |
| Aging preventing agent | 4 parts |
| Sulfur | 0.5 part |
| Vulcanization promoter | 4 parts |

*Transfer molding: 170° C. × 10 min

| FKM blending formulation | |
|---|---|
| THV series FKM | 100 parts |
| MT black | 13 parts |
| Calcium hydroxide (Ca(OH)$_2$) | 3 parts |
| Organic peroxide (hydroperoxide series) | 3 parts |
| Cross-linking aid | 2 parts |

*Compression molding: primary vulcanization 170° C. × 10 min, secondary vulcanization 200° C. × 24 h Regarding respective gaskets thus prepared, the following surface treatment was performed to prepare gaskets of Example, Comparative Example and Previous Example.

EMBODIMENT EXAMPLE

A sliding treating agent having the following composition was spray coated on a FKM gasket body and, immediately after, the body was placed into a drying furnace to dry under the conditions of 90° C.×5 min, followed by firing under the conditions of 180° C.×20 min to form a sliding coated film (15 μm).

| Composition of sliding treating agent | |
|---|---|
| PTFE emulsion | 45% |
| Urethane resin emulsion | 45% |
| Disperse dye | 3% |
| Propylene glycol | 3% |
| 3-(2-Aminoethyl)aminopropyltrimethoxysilane | 5% |

An appropriate amount of pure water was added to 100 parts of the above-described composition to obtain a sliding treating coating solution.

COMPARATIVE EXAMPLE

Molybdenum disulfide (average particle diameter 1 μm) was scattered on a FKM gasket body to obtain a sliding coated film.

CONVENTIONAL EXAMPLE

Sliding treatment was conducted by immersing a NBR/PVC gasket body in an aqueous trichloroisocyanuric acid solution, washing the body with water and drying it.

<Sliding/Sealability Test>

A fuel cap with the gasket which had been sliding-treated by each of the above methods, thereto, was subjected to a durability test (3000 times detachment from a filler neck), and the relationship between a securing torque and a rotation angle to 1.5N·m was investigated.

Figure 3:
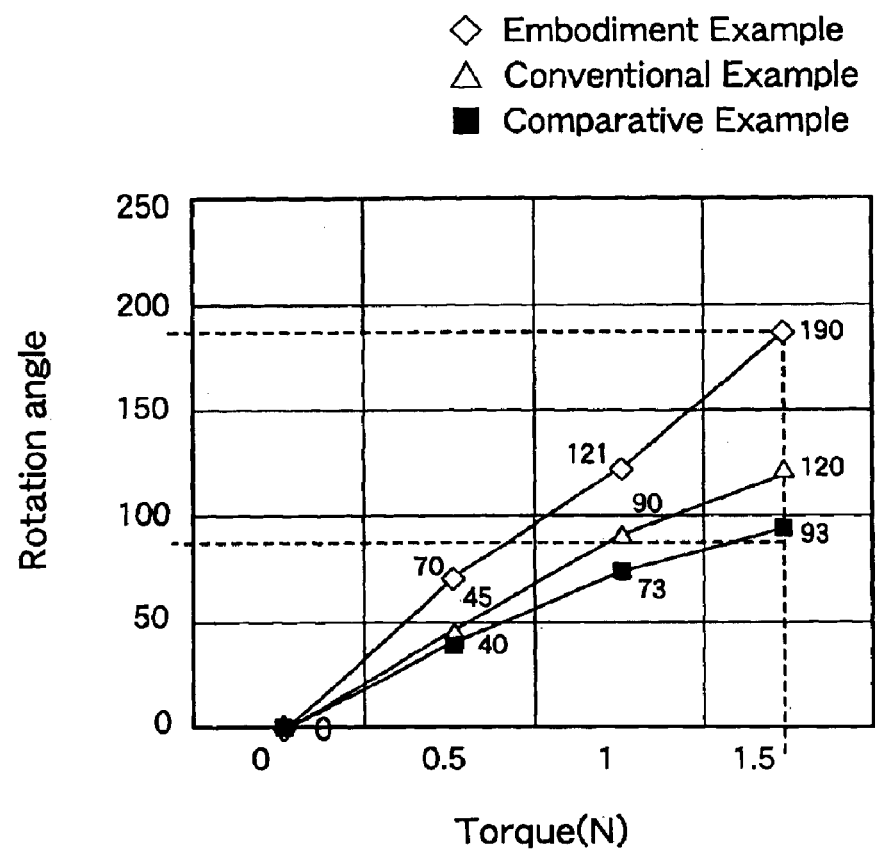
FIG. 3 is a graph showing the relationship between a torque and a cap rotation angle in Experimental Example and a diagram showing the results of a wrenching test.

Further, in such the state, a pressure in a cap attached to a load cell was set at 12.7 kPa, and a wrenching sealability test was performed. In this wrenching sealability test, no leakage at 10 ml/min or greater until breakage of a fuel cap was regarded as satisfied (assessment results are shown in FIG. 3). The wrenching sealability test was performed as follows:

As shown in FIG. 1(B), a wrenching equipment 21 was abutted against about ¼ of a lower end 18a of a shell 18, and a wrenching weight was loaded in an arrow 22 direction.

The relationship between a cap torque and a rotation angle is shown in FIG. 3 and it can be seen that sliding property is better in the present invention. That is, it can be seen that a great rotation angle can be obtained at a smaller securing torque in Example of the present invention as compared with not only Comparative Example of MoS$_2$ scattering but also Precious Example of chlorinating treatment. In any cases, the static sealability was satisfied, and since a rotation angle is great and compressibility can be easily maintained in the gasket of Example of the present invention, it can be seen that the stricter sealability such as wrenching sealability can be easily maintained.

In the gasket having a size of Experimental Example, at a securing torque of 1.5N·m, a rotation angle was 93° [reduced compressibility (interference):1.6 mm] in Comparative Example of MOS$_2$ scattering, while a rotation angle was 190° [reduced compressibility:3.3 mm] in Embodiment Example of the present invention.

What is claimed is:

1. A gasket comprising:

a fluorine rubber gasket body and a sliding-treated layer on the surface of the fluorine rubber gasket body;

the sliding-treated layer being baked coated film of a sliding treating agent, and being an aqueous emulsion comprising a solid lubricant, an urethane-based resin as a matrix, and a reactive group-coupled alkyltrialkoxysilane series compound (ATAS) represented by the following chemical formula as an adherability modifier:

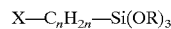

$$X-C_nH_{2n}-Si(OR)_3$$

wherein

X (reactive group) is an amino-containing group or an epoxy-containing group. n is a natural number of 2 to 4, and R is an alkyl group having a carbon number of 1 to 3, and a dry thickness of the sliding-treated layer is between 3 and 40 μm.

2. A gasket comprising:

a fluorine rubber gasket body and a sliding-treated layer on the surface of the fluorine rubber gasket body;

the sliding-treated layer being a baked coated film of a sliding treating agent, the sliding treating agent being an aqueous emulsion comprising 20% to 70% of an emulsified solid lubricant, 20% to 70% of an emulsified urethane-based resin as a matrix, and 2% to 8% of a reactive group-coupled alkyltrialkoxysilane series compound (hereinafter "ATAS") represented by the following chemical formula as an adherability modifier:

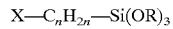

wherein

X (reactive group) is an amino-containing group or an epoxy-containing group, n is a natural number of 2 to 4, and R is an alkyl group having a carbon number of 1 to 3.

3. The gasket according to claim 2, wherein the aqueous emulsion comprises 30% to 60% of the emulsified solid lubricant, 30% to 60% of the emulsified urethane-based resin as a matrix, and 4% to 6% of the ATAS.

4. The gasket according to claim 3, wherein the solid lubricant is a fluorine resin powder.

* * * * *

UNITED STATES PATENT AND TRADEMARK OFFICE
CERTIFICATE OF CORRECTION

PATENT NO. : 6,962,352 B2
DATED : November 8, 2005
INVENTOR(S) : Sato et al.

It is certified that error appears in the above-identified patent and that said Letters Patent is hereby corrected as shown below:

<u>Title page,</u>
Item [75], Inventors, fourth inventor should read -- Hirokazu Fujino, Bisai (JP) --.

Signed and Sealed this

Twenty-first Day of March, 2006

JON W. DUDAS
*Director of the United States Patent and Trademark Office*